June 20, 1939.   A. NOVAK   2,163,348
AMUSEMENT DEVICE
Filed May 23, 1938

ALBERT NOVAK
INVENTOR

BY *Victor J. Evans & Co.*
ATTORNEYS

Patented June 20, 1939

2,163,348

UNITED STATES PATENT OFFICE 2,163,348

AMUSEMENT DEVICE

Albert Novak, New York, N. Y.

Application May 23, 1938, Serial No. 209,566

3 Claims. (Cl. 273—161)

This invention relates to improvements in amusement devices and more especially to a novel game for asking and answering questions, having relationship to astrological forecasts.

It is among the more important objects of the instant invention to provide a novel game device including means for selecting a question from a group of questions, by means determined and controlled by the happening of a fortuitous occurrence, and for determining an answer to said question depending upon the happening of a fortuitous occurrence, wherein the mode of selection of a question and answer will simulate astrological forecasting.

Another object of the present invention is to provide a device comprising a board divided into areas corresponding to questions, certain of said areas presenting the same visual effect and certain other of said areas presenting a visual effect different from said first visual effect, and a plurality of substantially spherical tokens adapted to roll upon said surface and be received in openings formed in each of said distinctive areas, whereby one of said areas can correspond to a question and the sum of tokens in areas of a common visual effect can signify approval or disapproval, affirmation or negation of the questions asked.

One of the advantages of the device according to the present invention is that it can be easily fabricated from materials commonly available and hence is well suited to the requirements of mass productions.

Among the more important features of the novel amusement and game device according to the present invention, are its simplicity and ruggedness of construction whereby it is adapted to withstand hard and continued usage.

Other objects, advantages and features of the device according to the present invention will be apparent to those skilled in the art during the course of the following description.

Regarded in certain of its broader aspects, the present invention comprises a hollow substantially cylindrical casing, closed at one end by a transparent window, having a partition extending transversely across said casing in an intermediate locality thereof, an exposed surface of said partition being divided into a plurality of areas having different visual effects, a plurality of pocket-like depressions or openings formed in said exposed surface of said partition and extending therethrough, one of said openings being located in each of said visually distinguishable areas, a plurality of substantially spherical tokens positioned upon and adapted to roll on said exposed surface of said partition, said tokens and said surface being observable through said window, and a plurality of indicia carrying discs mounted in the opposite end of said casing and exposable, in portion, through both ends of said casing to view by the operator.

In order to facilitate a fuller and more complete understanding of the present invention, a specific embodiment thereof will be hereinafter described, it being clearly understood, however, that the illustrated embodiment is given solely by example and is non-limitative.

Referring then to the drawing.

Figure 1:
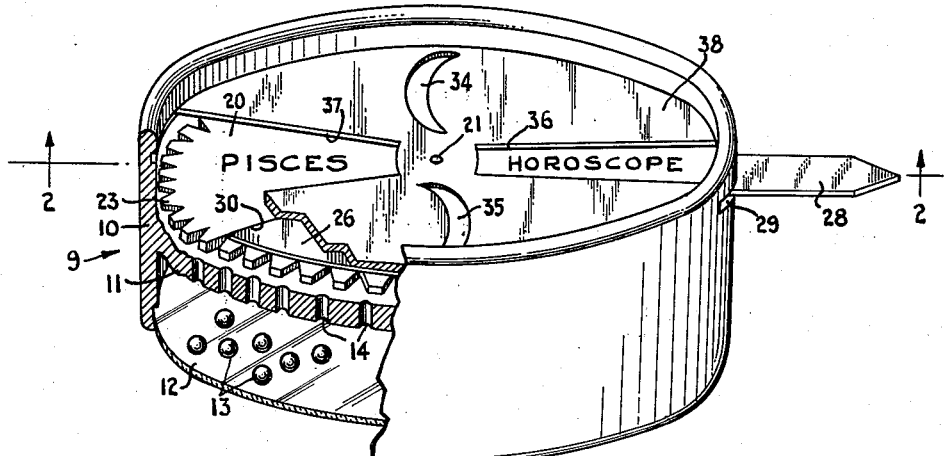
Figure 1 is substantially a perspective view of an amusement device or game according to the now preferred embodiment of the present invention.
Figure 2:
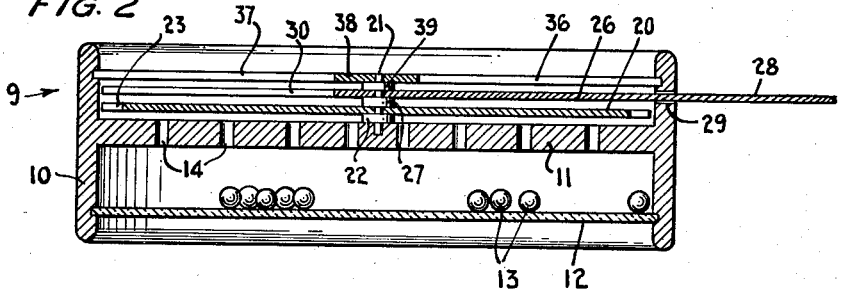
Figure 2 is substantially a vertical sectional view of Figure 1 taken along the line 2—2.
Figure 3:
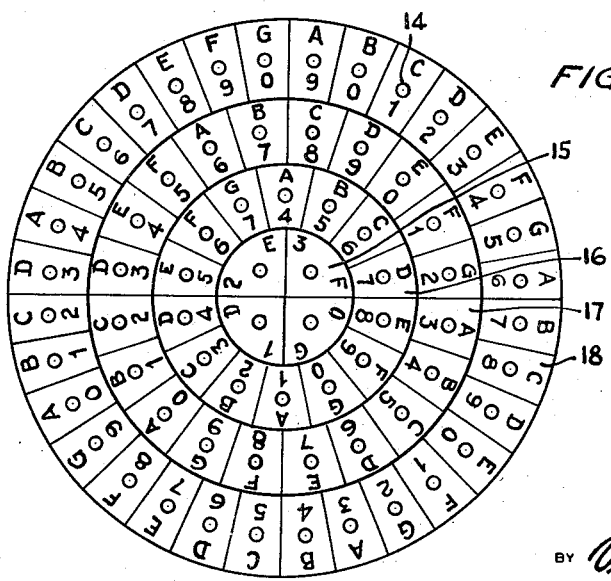
Figure 3 is substantially a top plan view of the partition showing the now preferred arrangement of the visually dissimilar areas thereon.

Referring then to the drawing and especially Figures 1 and 2 thereof, the amusement and game device generally designated by the numeral 9, comprises a substantially cylindrical casing 10, open at the ends and having a partition 11, positioned therein and extending transversely thereacross, said partition preferably being formed integrally with said casing. One exposed surface of said partition 11 is sub-divided into a plurality of visually distinctive areas, substantially as illustrated in Figure 3, whereby a plurality of concentric areas 15, 16, 17 and 18 are presented, each of said areas being substantially annular in form and radially sub-divided to exhibit a plurality of segmental spaces. In the now preferred embodiment of the present invention, each of these spaces is visually distinct from the spaces adjoining thereto but with alternate spaces having the same or substantially the same visual effect whereby approximately half of the spaces present essentially the same visual effect, hereinafter referred to as a first visual effect and the remainder of the spaces present a common visual effect different from said first visual effect.

The hereinabove referred to exposed surface of the partition 11 is provided with a plurality of openings, one of which is designated by the numeral 14, one of said openings being located in each of said segmental visually distinct spaces on said surface substantially as shown in Figure 3. It is preferred that these openings be pocket-like depressions formed in the partition surface, extending through said partition whereby objects can be viewed therethrough as will be hereinafter described.

A plurality of substantially spherical weighted tokens, certain of which are designated by the numeral 13, are confined within said casing in the space adjoining said exposed face of said partition hereinabove referred to, said tokens being held in said space by the partition, the walls of the casing and a visually transparent window 12, said window to be hereinafter described. The size of said tokens, in a measure is determined by the size of the openings or pocket-like depressions formed in the partition or vice versa, it being desired that the tokens be suited to roll upon the said surface of the partition and rest in the openings formed therein. According to the now preferred embodiment of the present invention, one of the tokens is visually distinguishable from the others. The purpose of this relationship of parts will be apparent subsequently during description of use of the device.

The window 12 hereinabove referred to, can be made of glass or can comprise other transparent material as conditions or preferences may warrant, it being understood of course, that the window is substantially fixedly mounted in the casing end and permits exposure of at least most of the surface of the partition hereinbefore described.

A substantially flat disc 20, positioned within the casing 10 and substantially freely rotatable upon the trunnion pin 21, is normally positioned adjacent the area face of the partition 11 in spaced relationship thereto, substantially as shown. Spaced relationship of disc 20 and the partition 11 is facilitated by interposition of the washer 22. A spherical portion of the disc 20 is provided with cutaway portions defining a serrated edge, generally designated by the numeral 23. Indicia, preferably signs of the zodiac or names of the signs of the zodiac are provided on one face of the disc 20 and are observable, as illustrated in Figure 1, as will be hereinafter described.

A second disc 26 also rotatably mounted on the trunnion pin 21 and spaced relative to the disc 20 by means of washer 27, is provided with a handle member 28, extending through an opening 29 formed in the side of the casing, whereby rotative movement of said disc 26 is facilitated. A segmental cutaway portion 30 formed in said disc 26 exposes a portion of the surface of the disc 20 carrying indicia thereon, hereinabove referred to. The disc 26 is also provided with indicia on the top thereof, said indicia being exposable through openings 34, 35 and 36 formed in the cover 38, substantially as shown in Figure 1. The cover 38 is substantially fixedly mounted in the end portion of the casing and is provided with an opening near the center thereof for holding one end of the trunnion pin 21, the other end of said pin being journalled in the partition 11, substantially as illustrated in Figure 2.

It will be noted that the segmental opening 37 formed in the cover 38 corresponds in position to the segmental opening 30 formed in the disc 26, whereby indicia on the disc 20 are visible through said openings. The segmental opening 36 exposes indicia on the disc 26, said indicia being different for different positions of the handle member 28 within the slot-like opening 29 formed in the casing. Indicia carried on the top surface of the disc 26 are visible through the crescent shaped openings 34 and 35, said indicia, like the indicia visible through the segmental opening 36, being different for different positions of the handle member 28 in the opening 29.

It will be seen that a washer 39 is positioned upon the trunnion pin 21 and serves to hold the disc 26 in spaced relationship, relative to the cover member 38.

In order to facilitate a clearer understanding of the matter of the present invention, games which can be played with the device will now be described, it being understood of course, that these games are given by way of suggestion and are non-restrictive upon the scope of the present invention.

In playing the first type of game, the segmental spaces or areas on the partition are provided with letters and numbers thereon, substantially as shown in Figure 3. A chart is provided accompanying the game device having a series of questions printed thereon, each question being tagged with a number and letter corresponding to a space or segmental area on the partition surface. The chart also includes means for enabling the player to determine the sign of the zodiac equivalent to his birth date. The player then proceeds as follows: he ascertains the sign of the zodiac corresponding to his birth date; he sets the disc 20 so that the indicated sign of the zodiac is exposed through the segmental opening 30 and 37, the setting being accomplished by engaging a stylus with the serrated edge portion 23 of the disc 20 exposed through the segmental opening 30 formed in the disc 26. Indicia are provided on the reverse face of the disc 20, exposable through the openings 14, said indicia being different for different positions of the disc 20, whereby the indicia exposed through the openings 14 can have a predetermined relationship with the sign of the zodiac viewed through the segmental opening referred to. Having set the disc 20 as aforesaid, the player moves the disc 38 by manipulation of the handle 28 whereby the indicia exposed through the openings 34, 35 and 36 can be changed. The player then inverts the device whereby the partition 11 is positioned substantially horizontally and by imparting rotative movement to the device, the spherical tokens 13 are caused to move about on the surface of the partition and ultimately to come to rest in certain of the openings 14 formed therein. One of the tokens is visually distinct from the other tokens. The visually distinct token is used to select a question on the accompanying chart, that is to say, assuming said token falls in the opening positioned within the segment labelled A—9, the question will correspond to the numeral A—9 on the chart. The other tokens determine the answer to the question. That is to say, approximately half of the segmental areas are of one visual effect and the remainder are of a different visual effect: The visual effect of one group is made to correspond to an affirmation or approval of the question asked and the other group, correspondingly, negation or disapproval of the question or proposition involved. Simple numerical majority of tokens resting in segmental spaces having common visual effect, determines the answer to the question.

A second type of game can be played by proceeding as described in connection with the first type of game, whereby the discs are set in proper positions, it being understood of course that the disc 38 is set at a position different from the position occupied during playing of the first game, and manipulating the device whereby the spherical tokens are positioned in the several openings in the partition 11 as hereinbefore referred to. The visually distinguishable token, in this instance, selects the digit of a number and the other tokens signify affirmation or disaffirmation of the selection.

It will be apparent then that in this manner, questions or propositions can be selected and answer to said questions or approval or disapproval of said propositions can be obtained as a result of visual fortuitous occurrences. It will also be evident that the device according to the present invention provides means for selecting numbers by the happening of entirely fortuitous occurrences.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An amusement device of the type described comprising a hollow, substantially cylindrical casing, open at the ends; a partition within said casing, extending transversely thereacross, dividing the interior of said casing into a first and a second portion, said partition having a plurality of openings formed therein extending therethrough; a plurality of weighted, substantially spherical tokens, confined in said first portion of said casing; a visually transparent window mounted in and closing the end of said casing comprising said first portion; a relatively fixedly positioned cover positioned across the end of said second portion of said casing, said cover having a pair of diametrically positioned segmental openings and a pair of diametrically positioned crescent shaped openings formed therein; a centrally located trunnion pin journalled in said cover and in said partition and extending coaxially within said casing; a first disc, positioned between said partition and said cover, freely rotatably mounted on said trunnion pin and having a segmental opening formed therein alignable with one of said segmental openings in said cover, said disc having indicia on the surface thereof exposable through the other of said segmental openings and through said crescent shaped openings in said cover, a radially extending handle formed integral with said disc and extending through a slot-like opening in said casing for facilitating and limiting rotative movement of said disc; and a second disc, positioned between said first disc and said partition, freely rotatably mounted on said trunnion pin, said second disc having a serrated edge portion and being provided with indicia on one face thereof visible through said segmental opening in said first disc and with indicia on the other face thereof visible through said openings in said partition.

2. An amusement of the type described comprising a hollow, substantially cylindrical casing, open at the ends; a partition within said casing, extending transversely thereacross, dividing the interior of said casing into a first and a second portion, part of the surface of said partition adjoining said first portion being divided into a plurality of concentrically positioned annular shaped spaces, each of said spaces being radially sub-divided to present a plurality of segmental areas, each of said segmental areas being different in visual effect from adjoining segmental areas, a first group comprising numerically substantially half of said segmental areas having a common visual effect and a second group comprising the other of said areas having a common visual effect different from the visual effect of said first group; said partition having a plurality of openings formed therein extending therethrough, one of said openings being located in each of said segmental areas; a plurality of weighted, substantially spherical tokens, confined in said first portion of said casing; and a visually transparent window mounted in and closing the end of said casing comprising said first portion.

3. An amusement device of the type described comprising a hollow, substantially cylindrical casing, open at the ends; a partition within said casing, extending transversely thereacross, dividing the interior of said casing into a first and a second portion, part of the surface of said partition adjoining said first portion being divided into a plurality of concentrically positioned annular shaped spaces, each of said spaces being radially sub-divided to present a plurality of segmental areas, each of said segmental areas being different in visual effect from adjoining segmental areas, a first group comprising numerically substantially half of said segmental areas having a common visual effect and a second group comprising the other of said areas having a common visual effect different from the visual effect of said first group; said partition having a plurality of openings formed therein extending therethrough, one of said openings being located in each of said segmental areas; a plurality of weighted, substantially spherical tokens, confined in said first portion of said casing, one of said tokens being visually distinguishable from the other tokens; a visually transparent window mounted in and closing the end of said casing comprising said first portion; a relatively fixedly positioned cover positioned across the end of said second portion of said casing, said cover having a pair of diametrically positioned segmental openings and a pair of diametrically positioned crescent shaped openings formed therein; a centrally located trunnion pin journalled in said cover and in said partition and extending coaxially within said casing; a first disc, positioned between said partition and said cover, freely rotatably mounted on said trunnion pin and having a segmental opening formed therein alignable with one of said segmental openings in said cover, said disc having indicia on the surface thereof exposable through the other of said segmental openings and through said crescent shaped openings in said cover, a radially extending handle formed integral with said disc and extending through a slot-like opening in said casing for facilitating and limiting rotative movement of said disc; and a second disc, positioned between said first disc and said partition, freely rotatably mounted on said trunnion pin, said second disc having a serrated edge portion and being provided with indicia on one face thereof visible through said segmental opening in said first disc and with indicia on the other face thereof visible through said openings in said partition.

ALBERT NOVAK.